United States Patent
Paesano et al.

(10) Patent No.: US 9,482,096 B1
(45) Date of Patent: Nov. 1, 2016

(54) TEXTURED LEADING EDGE FOR AEROSPACE AND NAUTICAL STRUCTURES

(71) Applicant: The Boeing Company, Chicago, IL (US)

(72) Inventors: Antonio Paesano, Newark, DE (US); Robert B. Thompson, Media, PA (US)

(73) Assignee: The Boeing Company, Chicago, IL (US)

(*) Notice: Subject to any disclaimer, the term of this patent is extended or adjusted under 35 U.S.C. 154(b) by 38 days.

(21) Appl. No.: 14/698,334

(22) Filed: Apr. 28, 2015

(51) Int. Cl.
| | |
|---|---|
| *B64C 3/14* | (2006.01) |
| *B64C 39/00* | (2006.01) |
| *B64C 39/10* | (2006.01) |
| *F01D 5/14* | (2006.01) |
| *B64C 3/26* | (2006.01) |
| *B63B 1/06* | (2006.01) |
| *B63H 25/38* | (2006.01) |

(52) U.S. Cl.
CPC .......... *F01D 5/141* (2013.01); *B63B 1/06* (2013.01); *B63H 25/38* (2013.01); *B64C 3/26* (2013.01); *F05D 2220/323* (2013.01); *F05D 2220/36* (2013.01); *F05D 2240/30* (2013.01); *F05D 2250/63* (2013.01)

(58) Field of Classification Search
CPC .......... F01D 5/28; F01D 5/286; F01D 5/14; F01D 5/141; B63B 1/06; B63H 25/38; B64C 3/28; B64C 2003/148; F05D 220/36; F05D 220/323; F05D 2240/31; F05D 2240/303; F05D 2250/60; F05D 2250/61; F05D 2250/611; F05D 2250/63
USPC .............................. 244/200, 200.1
See application file for complete search history.

(56) References Cited

U.S. PATENT DOCUMENTS

| | | | | |
|---|---|---|---|---|
| 4,907,765 A | * | 3/1990 | Hirschel | B64C 21/10 244/130 |
| 5,114,099 A | * | 5/1992 | Gao | B64C 21/10 244/130 |
| 5,133,516 A | * | 7/1992 | Marentic | B05D 5/02 244/130 |
| 6,805,325 B1 | * | 10/2004 | Malmuth | B64C 21/00 244/130 |
| 8,678,316 B2 | * | 3/2014 | Rawlings | B32B 3/08 244/130 |
| 2008/0159870 A1 | * | 7/2008 | Hong | B23P 6/007 416/224 |
| 2009/0126838 A1 | * | 5/2009 | Silvia | C21D 1/18 148/660 |
| 2010/0127125 A1 | * | 5/2010 | Li | B21B 1/227 244/119 |
| 2010/0242996 A1 | | 9/2010 | West et al. | |
| 2011/0186685 A1 | * | 8/2011 | Tsotsis | B64C 21/10 244/130 |
| 2012/0049008 A1 | * | 3/2012 | Domel | B64C 21/10 244/200 |
| 2013/0071252 A1 | * | 3/2013 | Nissen | B64C 11/205 416/224 |
| 2014/0093378 A1 | * | 4/2014 | Clavette | B64C 11/205 416/224 |

* cited by examiner

*Primary Examiner* — Richard G Davis
(74) *Attorney, Agent, or Firm* — Joseph M. Rolnicki; Evans & Dixon, L.L.C.

(57) ABSTRACT

A surface area of a structure is fabricated with a textured surface that reduces the surface wear rate or erosion caused by a high speed flow of fluid containing abrasive particles over the surface area. More particularly, a leading edge surface such as a rotor leading edge surface, an aircraft airfoil leading edge surface, a propeller leading edge surface, etc. is fabricated with a textured surface comprised of a plurality of grooves that alter or break up a high speed flow of fluid containing abrasive particles over the textured surface. The grooves are contacted by the high speed flow of fluid containing the abrasive particles and alter or break up the flow of fluid and abrasive particles and thereby reduce surface wear rate or erosion of the structure leading edge.

27 Claims, 6 Drawing Sheets

TEXTURED LEADING EDGE FOR AEROSPACE AND NAUTICAL STRUCTURES

FIELD

This disclosure pertains to a surface area of a structure that has been fabricated with a textured surface that reduces the surface wear rate or erosion caused by a high speed flow of fluid containing abrasive particles over the surface area. By "fluid", what is meant is a liquid, a gas or a combination thereof. More particularly, this disclosure pertains to a leading edge surface such as a rotor leading edge surface, an aircraft airfoil leading edge surface, a propeller leading edge surface, etc. that is fabricated with a textured surface comprised of a plurality of grooves that alter or break up a high speed flow of fluid containing abrasive particles over the textured surface. The grooves are contacted by the high speed flow of fluid containing the abrasive particles and alter or break up the flow of fluid and abrasive particles and thereby reduce surface wear rate or erosion of the structure leading edge.

BACKGROUND

On structures such as aircraft rotor blades, aircraft airfoil surfaces on wings, wind turbine blades, marine propellers and rudders, and other such similar structures, the leading edges of these structures experience a surface wear rate or erosion as the leading edges are moved at a high speed through fluid such as air or water during operation of the structures. This is particularly true where the leading edges of the structures are moved at high speed through a fluid containing airborne or waterborne abrasive particles, such as sand in the air or water.

In the past, attempts to address the surface wear rate or erosion of the leading edge surfaces of structures involved the use of sacrificial coatings on the leading edge surfaces, replaceable metallic and non-metallic shields secured to the leading edge surfaces, or replacement of the entire structure when the leading edge surface of the structure was eroded beyond usable limits. However, each of these solutions is expensive, and some undesirably add weight to the structure.

SUMMARY

The textured surface of this disclosure is designed to minimize the erosion that sand or other airborne or waterborne abrasive particles moving at high speed, or gases moving at high speed cause on the leading edge surfaces of structures such as aircraft rotor blades, aircraft airfoil surfaces on wings, wind turbine blades, marine propellers and rudders, and other such similar structures. The textured surface can be formed into a surface area of a leading edge of a structure, or applied to the surface area of the leading edge of the structure.

Basically, the textured surface is characterized by a plurality of grooves that are recessed into the surface area or formed on the surface area of the leading edge surface of the structure. The plurality of grooves can have a variety of shapes and combinations of shapes. The shapes may have a range of different orientations with respect to the leading edge area of the structure and the direction of fluid flow over the leading edge surface. Spacings between the plurality of grooves may also be varied to suit the modified leading edge surface to conditions it will encounter.

The plurality of grooves are positioned on or near the leading edge surface area of the structure that moves at a high speed through a fluid flow containing abrasive particles in operation of the structure. The grooves on the leading edge surface area alter or break up the flow direction of the fluid contacting the grooves and alter or break up the flow direction of the abrasive particles contacting the grooves. The altered fluid flow direction and altered particle flow direction reduces surface wear rate or erosion of the structure leading edge region.

BRIEF DESCRIPTION OF THE DRAWINGS

Further features of the textured surface are set forth in the following detailed description and drawing figures.

DESCRIPTION

Figure 1:
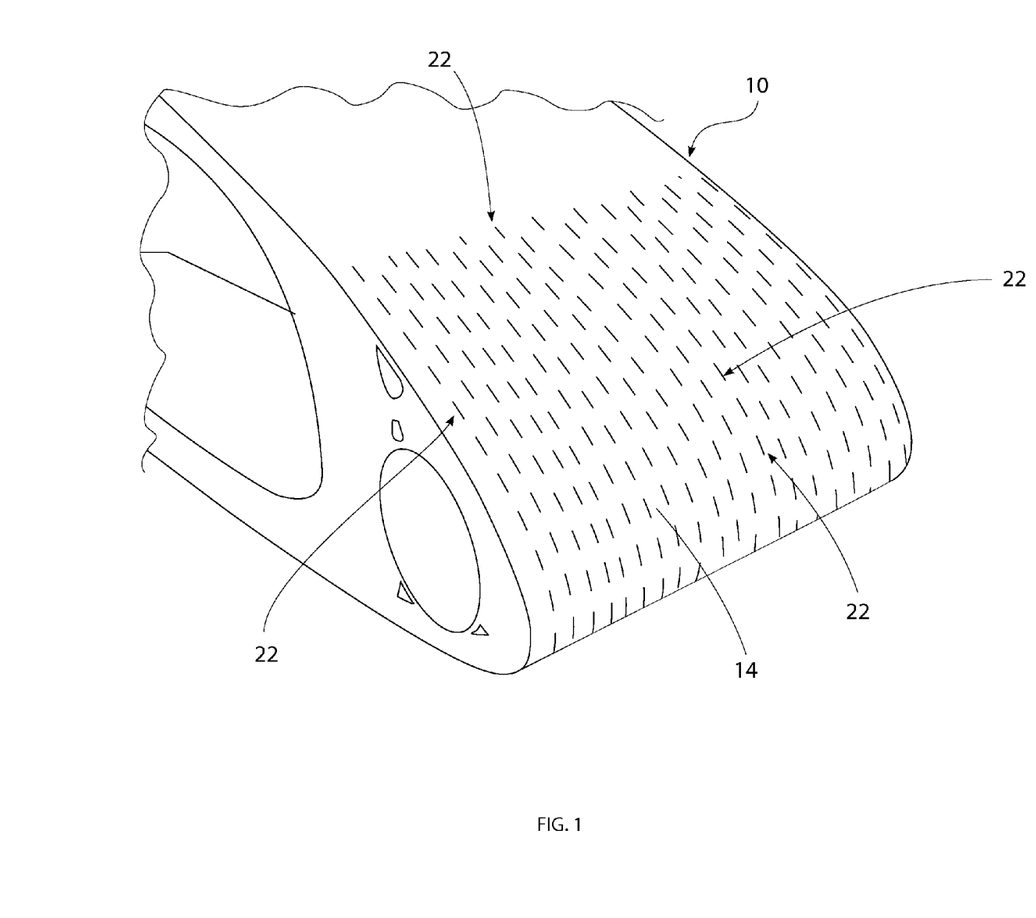
FIG. 1 is a representation of a perspective view of a textured surface on a leading edge surface of a structure.

FIG. 1 is a perspective view of a cross-section of a portion of a structure fabricated with a textured surface of this disclosure. In the representation of FIG. 1, the structure 10 is a portion of a propeller rotor blade. However, the textured surface is not limited to use on only rotor blade surfaces. As stated earlier, a textured surface can be fabricated on structures such as aircraft rotor blades, aircraft airfoil surfaces on wings, wind turbine blades, marine propellers and rudders, and other such similar structures having a leading edge surface area that experiences a surface wear rate or erosion as the leading edge surface area is moved at high speed through a fluid such as air or water during operation of the structure. As a few examples of structures that move at high speed through a fluid, a helicopter rotor blade or an airplane propeller could be moving through air at least 713 km/h, a jet engine turbine blade could be moving through air at least 2655 km/h, and a ship bow could be moving through water at least 26 knots (48 km/h).

Figure 2:
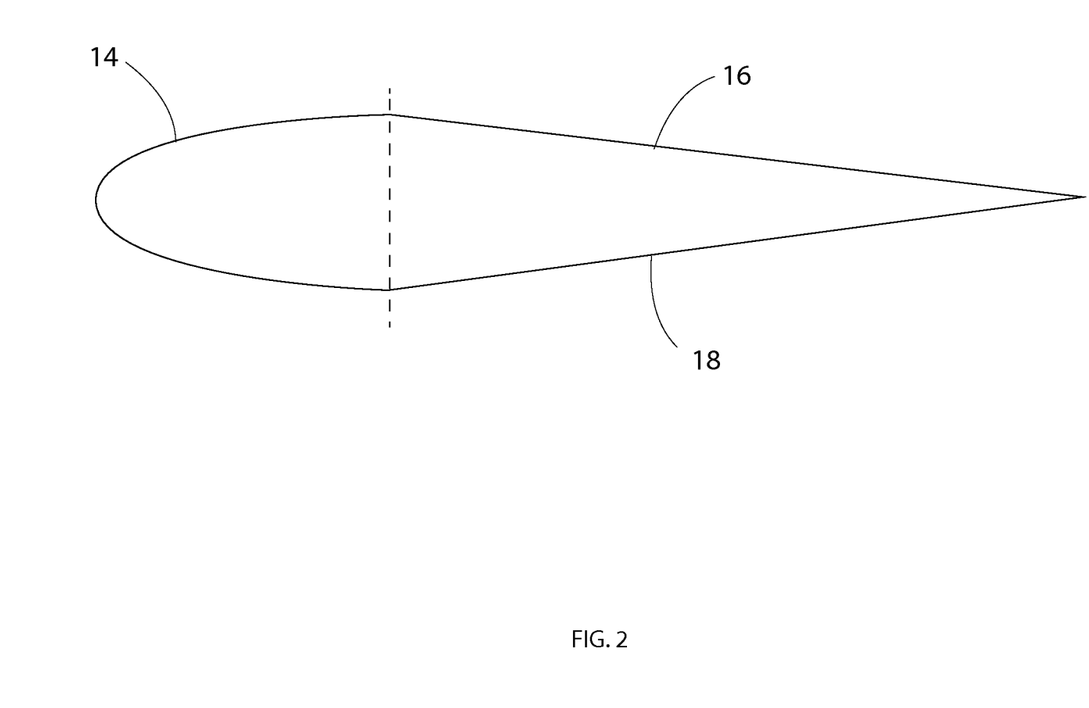
FIG. 2 is a representation of a side cross-section view of the textured surface on a leading edge surface of a structure.

FIG. 2 is a representation of a cross-section view of the structure 10 of FIG. 1. A textured surface is applied to a first surface area 14 on the leading edge of the structure. In FIG. 2 the leading edge has a u-shaped cross-section. However, it should be understood that the textured surface could be used on a surface area of a leading edge surface having other cross-section configurations such as triangular, semicircular, etc.

Because the first surface area 14 of the structure is the surface area that passes at high speed through a fluid where the fluid could contain abrasive particles such as sand, it is only necessary that the first surface area 14 be fabricated with the textured surface of this disclosure. A second surface area 16 and a third surface area 18 of the structure 10 that are adjacent the first surface area 14 are not directly contacted by the high speed fluid or the particles in the high speed fluid during operation of the structure. Although it may not be necessary that the second surface area 16 and the third surface area 18 be fabricated with the textured surface, its use in these areas will be dictated by operating conditions encountered in the specific application.

Referring back to FIG. 1, the textured surface of the first surface area 14 is characterized by a plurality of grooves 22. The grooves 22 can be recessed into the material of the first surface area 14.

Figure 3:
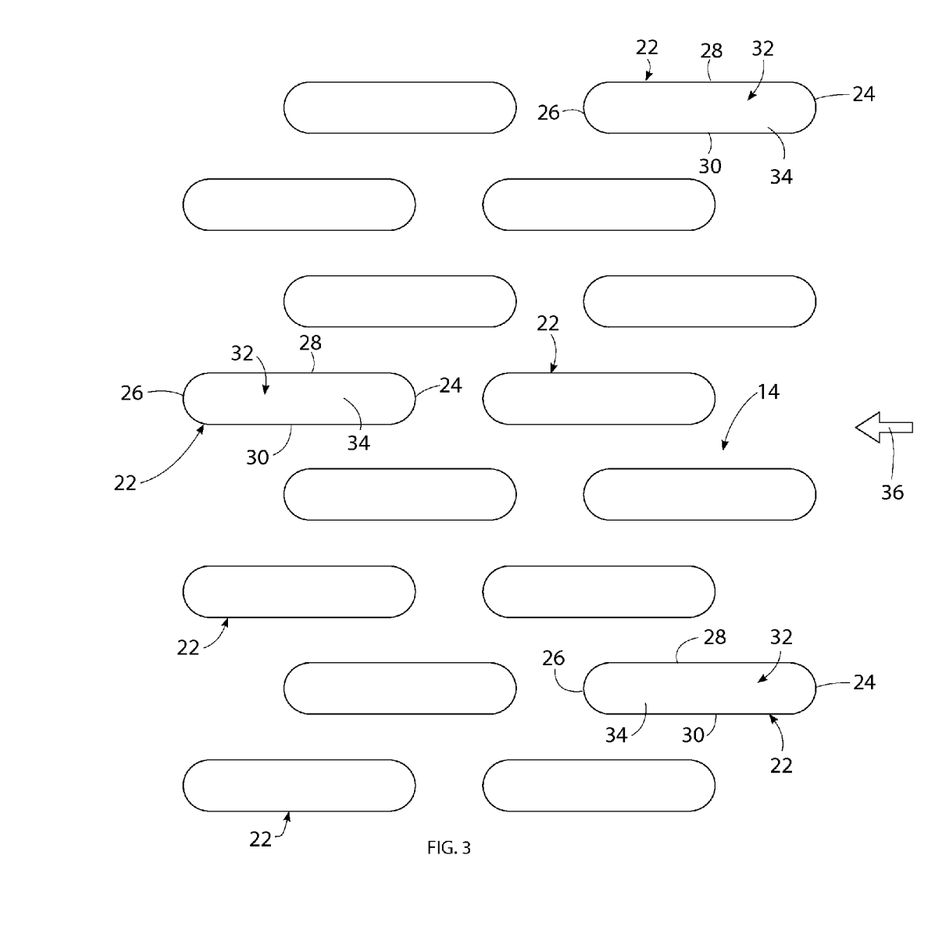
FIG. 3 is a representation of a plan view of a textured surface on a surface area of a structure.

The plurality of grooves 22 can have a variety of different configurations. As represented in FIG. 3, the grooves 22 have oblong configurations with straight, parallel side edges and rounded end edges. The grooves are formed in the first surface area 14 of the structure 10 with each groove having a length dimension between a first end edge 24 and a second end edge 26 of the groove, a width dimension between a first side edge 28 and an opposite second side edge 30 of the groove, and a depth dimension between a top opening 32 of the groove and a bottom surface 34 of the groove. The grooves 22 represented in FIG. 3 are arranged end to end and side by side with respect to the direction of fluid flow over the leading edge first surface area 14 represented by the arrow 36. As represented in FIG. 3, the plurality of grooves 22 are arranged with the length dimensions of the plurality of grooves 22 aligned with the flow direction of fluid 36 over the first surface area 14 and with first end edges 24 of some immediately adjacent grooves 22 being spaced in the flow direction 36 from each other and with second end edges 26 of the immediately adjacent grooves 22 being spaced in the flow direction 36 from each other. However, the grooves 22 could have a range of different orientations with respect to the direction of fluid flow. The configurations of the grooves, the orientations of the grooves, the spacings between adjacent grooves 22, etc. may be varied to suit the modified leading edge first surface area 14 to conditions it will encounter in use of the structure 10.

Figure 4:
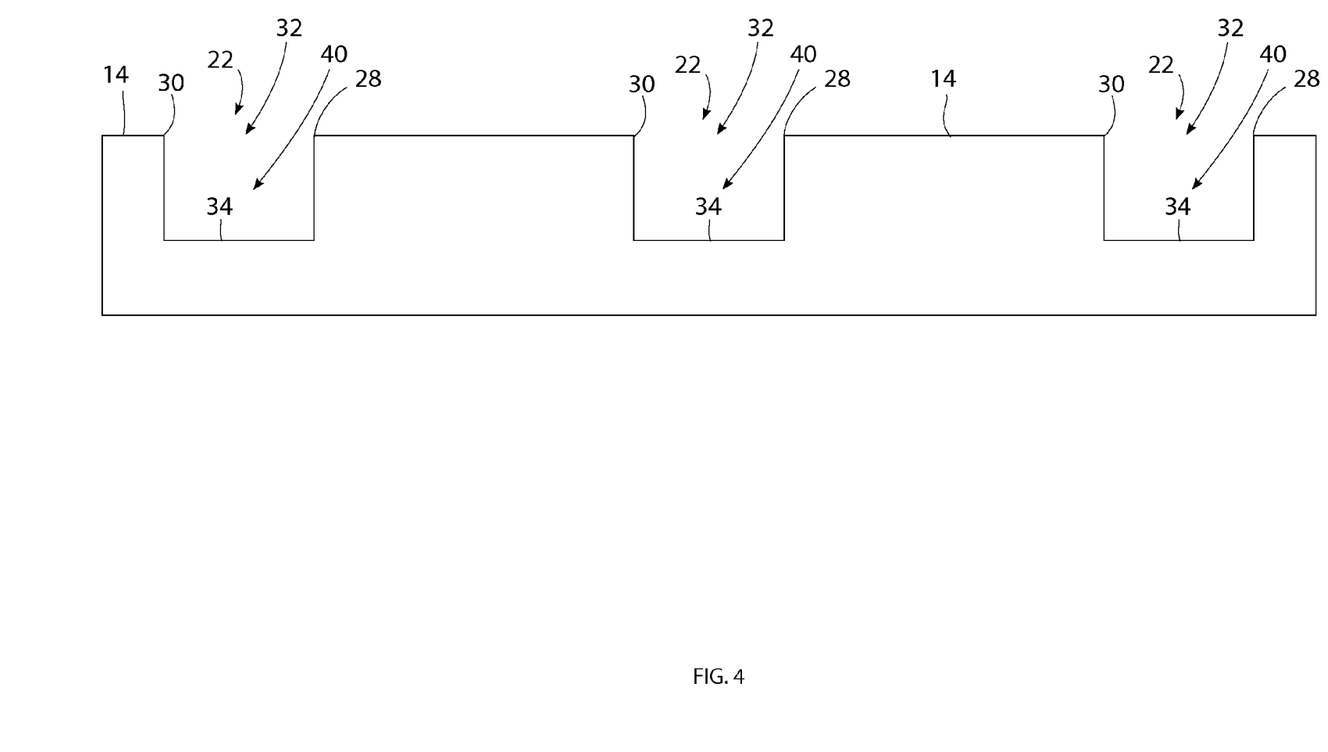
FIG. 4 is a representation of a cross-section view of a textured surface on a surface area of a structure.
Figure 5:
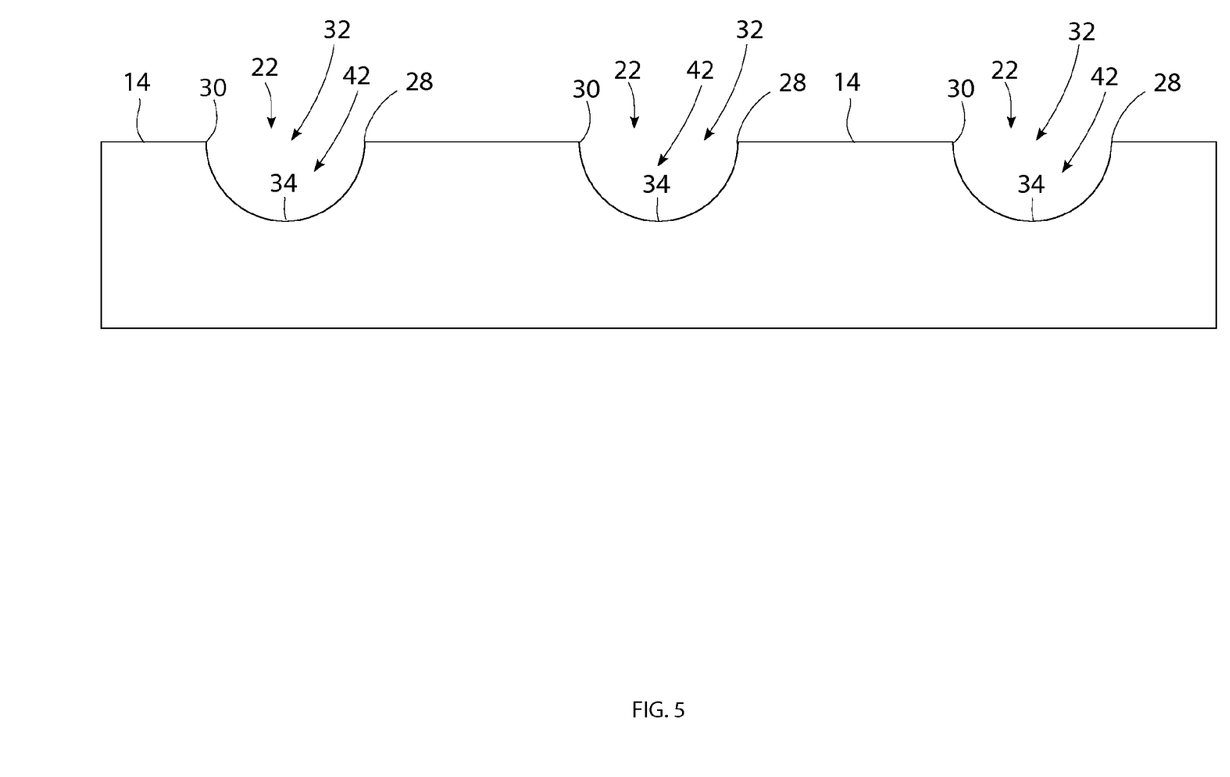
FIG. 5 is a representation of a cross-section view of a textured surface on a surface area of a structure.
Figure 6:
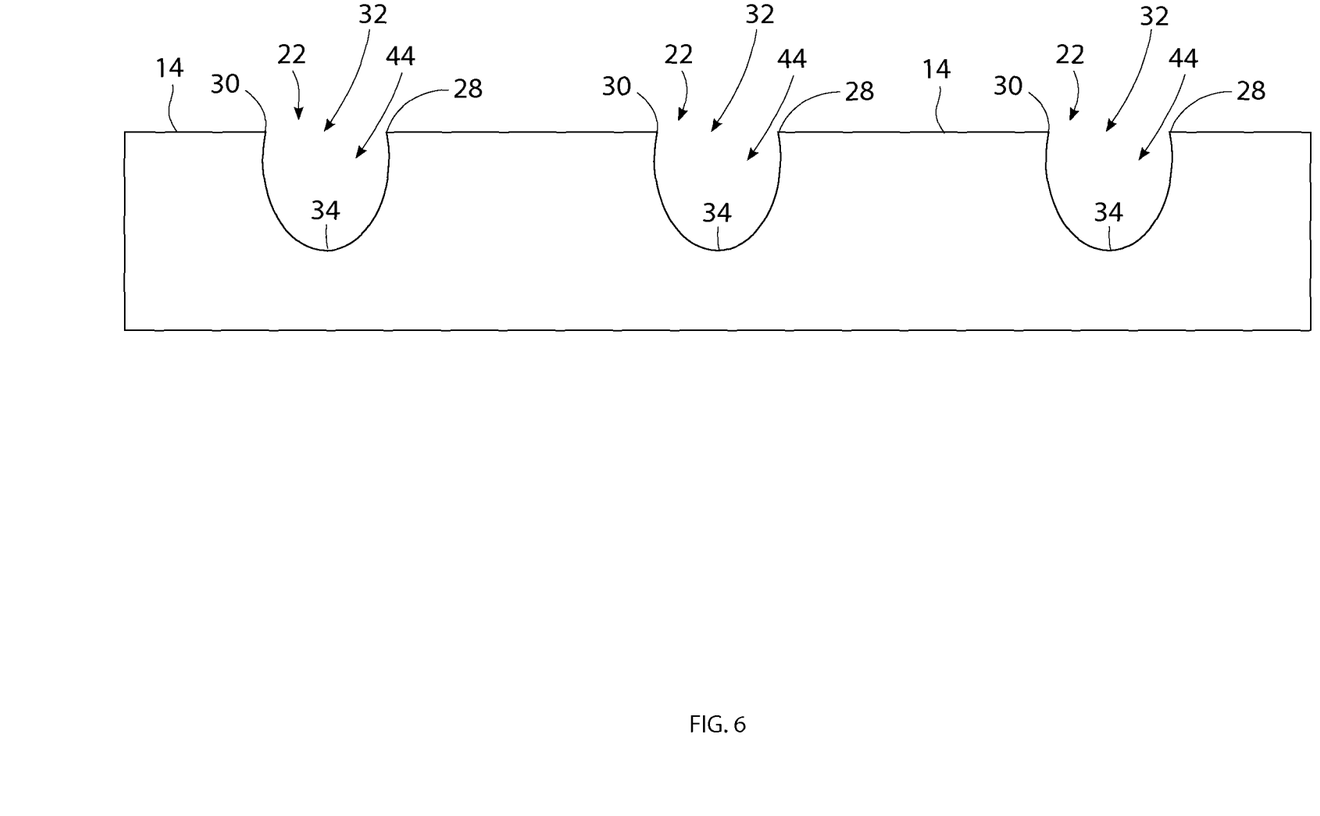
FIG. 6 is a representation of a cross-section view of a textured surface on a surface area of a structure.

As represented in FIGS. 4, 5, and 6, the grooves 22 can have a variety of different cross-section configurations across their length dimensions. The cross-section configurations could be rectangular or square 40 as represented in FIG. 4, circular as semicircular 42 as represented in FIG. 5, elliptical or parabolic 44 as represented in FIG. 6, etc. The particular cross-section configuration of the grooves 22 will depend on the specific structure having the textured surface on its leading edge surface, and the service conditions in which the structure will be used. In addition, the plurality of grooves 22 could have variations in width to depth aspect ratio in order to minimize the abrasive wear on the leading edge surface 14. The cross-section configurations of the grooves should not be limited to only the configurations shown in the drawing figures.

An example of the dimensions of a groove 22 such as the square cross-section groove 40 represented in FIG. 4 include a depth between the top opening 32 and the bottom surface 34 of one millimeter, a width between the first side edge 28 and the second side edge 30 of one millimeter, and a length dimension between the first end edge 24 as shown in FIG. 3 and the second end edge 26 as shown in FIG. 3 of two millimeters.

As stated earlier, the plurality of grooves 22 are positioned on the leading edge first surface area 14 of the structure 10 that moves at a high speed through a fluid flow containing abrasive particles in operation of the structure 10. The grooves 22 on the first surface area 14 alter or break up the flow direction of the fluid contacting the grooves 22 and alter or break up the flow direction of the abrasive particles contacting the grooves 22 without adding weight to the structure. The altered fluid flow direction and altered particle flow direction reduces the surface wear rate or erosion of the first surface area 14 of the structure 10. The erosion rate can be reduced by up to 50%. Thus, the grooves 22 increase the service life of the structure 10 with no performance penalty, potentially doubling the service life.

The grooves 22 of the textured first surface area 14 could be constructed or recessed into the material of the leading edge surface of the structure 10 by traditional manufacturing methods, such as laser etching, machining, chemical milling, etc. This would particularly be the case where the plurality of grooves 22 are being formed into the leading edge first surface area 14 of a structure that would be discarded when the textured first surface area 14 has worn out and the structure has lost its service performance.

Alternatively, the grooves 22 of the textured surface 14 could be formed in a temporary layer that is applied to the leading first surface area 14 of the structure 10. The temporary layer is not a permanent part of the structure 10, but is removed from the structure 10 when worn out and replaced with a new temporary layer having the grooves 22 of the textured first surface area 14. This would particularly be the case where the temporary layer could be manufactured less expensively than discarding and replacing the structure 10 when the textured first surface area 14 has worn out. The temporary layer having the grooves 22 of the textured surface 14 could be secured to the leading edge first surface area 14 of the structure 10 by fasteners, screws, adhesives, snap fit connections, welding or other equivalent methods.

Furthermore, the grooves 22 of the textured first surface area 14 could be formed into metallic material, plastics, rubbers, ceramics, composites, and a combination of these.

Still further, when the grooves 22 of the textured first surface area 14 have worn out, the grooves 22 could be renewed in place on the textured first surface area 14 by the traditional manufacturing methods mentioned earlier.

Additional manufacturing methods such as 3D printing and other fabrication methods classified as "additive manufacturing" could be used to construct the grooves 22 on the textured first surface area 14. Such additive manufacturing methods are characterized by the grooves 22 of the textured first surface area 14 of the structure 10 being made starting with a 3D drawing electronic file, which is converted into a set of very thin layers, which are then deposited one by one and bonded all together in one cohesive object in constructing the textured first surface area 14 of the structure 10.

Furthermore, 3D printing and any other of the above listed methods may be used to rebuild the textured first surface area 14 of the structure 10 when the first surface area 14 is worn out, without remaking the entire structure 10. This would achieve further cost savings.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A structure that moves at high speed through a fluid, the structure comprising:
   a first surface area on the structure, the first surface area being positioned on the structure to be a first surface on the structure to move at high speed through a fluid with a flow direction of the fluid passing over the first surface area before any other surface of the structure during operation of the structure; and, a plurality of grooves recessed into the first surface area, each groove of the plurality of grooves having a same configuration with a length dimension between a first end edge and an opposite second end edge of the groove and with a width dimension between a first side edge and an opposite second side edge of the groove, the plurality of grooves being arranged end to end and side by side with the length dimensions of the plurality of grooves aligned with the flow direction of the fluid passing over the first surface area and with first end edges of some immediately adjacent side by side grooves being spaced in the flow direction from each other and with second end edges of the immediately adjacent side by side grooves being spaced in the flow direction from each other, the plurality of grooves being positioned in the first surface area where with the first surface area moving at high speed through the fluid the grooves alter the flow direction of the fluid contacting the grooves and contacting the first surface area and thereby reduce erosion of the first surface area by the fluid.

2. The structure of claim 1, further comprising:
the plurality of grooves having substantially equal length dimensions between opposite first and second ends of the grooves, substantially equal width dimensions between opposite sides of the grooves, and substantially equal depth dimensions between top openings of the grooves and opposite bottom surfaces of the grooves.

3. The structure of claim 1, further comprising:
each of the grooves having a depth dimension between a top opening of the groove and an opposite bottom surface of the groove.

4. The structure of claim 1, further comprising:
the plurality of grooves having substantially same cross-section configurations across the length dimensions of the grooves.

5. The structure of claim 1, further comprising:
at least some of the plurality of grooves having different cross-section configurations across the length dimensions of the grooves.

6. The structure of claim 1, further comprising:
the first surface area being on a leading edge of the structure;
a second surface area on the structure, the second surface area being adjacent the first surface area and being continuous with the first surface area; and,
the plurality of grooves are only recessed into the first surface area and are not recessed into the second surface area.

7. The structure of claim 1, further comprising:
the structure being an aircraft rotor blade.

8. The structure of claim 1, further comprising:
the structure being an aircraft wing.

9. The structure of claim 1, further comprising:
the structure being a marine propeller.

10. The structure of claim 1, further comprising:
the structure being a turbine blade.

11. The structure of claim 1, further comprising:
the structure being an aircraft propeller.

12. The structure of claim 1, further comprising:
the structure being a bow of a watercraft.

13. The structure of claim 1, further comprising:
the structure being a rudder of a watercraft.

14. A structure that moves at high speed through a fluid, the structure comprising:

a first surface area on the structure, the first surface area being positioned on a leading edge of the structure to move at a high speed through a fluid with a flow direction of the fluid passing over the first surface area during operation of the structure; and,
a plurality of grooves formed on the first surface area, each groove of the plurality of grooves having a same configuration with a length dimension between a first end edge and an opposite second end edge of the groove and with a width dimension between a first side edge and an opposite second side edge of the groove, the plurality of grooves being arranged end to end and side by side with the length dimensions of the plurality of grooves aligned with the flow direction of the fluid passing over the first surface area and with first end edges of some immediately adjacent side by side grooves being spaced in the flow direction from each other and with second end edges of the immediately adjacent side by side grooves being spaced in the flow direction from each other, the plurality of grooves being positioned on the first surface area where with the first surface area moving at high speed through the fluid the grooves alter the flow direction of the fluid contacting the grooves and contacting the first surface area and thereby reduce erosion of the first surface area by the fluid.

15. The structure of claim 14, further comprising:
the plurality of grooves having substantially equal length dimensions between opposite first and second ends of the grooves, substantially equal width dimensions between opposite sides of the grooves, and substantially equal depth dimensions between top openings of the grooves and opposite bottom surfaces of the grooves.

16. The structure of claim 14, further comprising:
each of the grooves having depth dimension between a top opening of the groove and an opposite bottom surface of the groove.

17. The structure of claim 14, further comprising:
the plurality of grooves having substantially same cross-section configurations across the length dimensions of the grooves.

18. The structure of claim 14, further comprising:
at least some of the plurality of grooves having different cross-section configurations across the length dimensions of the grooves.

19. The structure of claim 14, further comprising:
a second surface area on the structure, the second surface area being adjacent the first surface area and being continuous with the first surface area; and,
the plurality of grooves are only recessed into the first surface area and are not recessed into the second surface area.

20. The structure of claim 14, further comprising:
the structure being an aircraft rotor blade.

21. The structure of claim 14, further comprising:
the structure being an aircraft wing.

22. The structure of claim 14, further comprising:
the structure being a marine propeller.

23. The structure of claim 14, further comprising:
the structure being a turbine blade.

24. The structure of claim 14, further comprising:
the structure being an aircraft propeller.

25. The structure of claim 14, further comprising:
the structure being a bow of a watercraft.

26. The structure of claim 14, further comprising:
the structure being a rudder of a watercraft.

27. A textured leading edge of an airfoil comprising:

a first surface area on the airfoil, the first surface area being positioned on the airfoil to be a first surface on the airfoil to move at high speed through a fluid with a flow direction of the fluid passing over the first surface area before any other surface of the airfoil during operation of a structure comprising the airfoil; and, a plurality of grooves recessed into the first surface area, each groove of the plurality of grooves having a same configuration with a length dimension between a first end edge and a opposite second end edge of the groove and with a width dimension between a first side edge and an opposite second side edge of groove, the plurality of grooves being arranged end to end and side by side with the length dimensions of the plurality of grooves aligned with the flow direction of the fluid passing over the first surface area and with first end edges of some immediately adjacent side by side grooves being spaced in the flow direction from each other and with second end edges of the immediately adjacent side by side grooves being spaced in the flow direction from each other, the plurality of grooves being positioned in the first surface area where with the first surface area moving at high speed through the fluid, the grooves alter the flow direction of the fluid contacting the grooves and contacting the first surface area and thereby reduce erosion of the first surface area by the fluid.

* * * * *